United States Patent [19]

Liu

[11] Patent Number: 5,568,137

[45] Date of Patent: Oct. 22, 1996

[54] VEHICLE LANE GUIDE AND ALERTING DEVICE

[76] Inventor: Jian S. Liu, 249 W. Dayton Yellow Springs Rd., #345, Fairborn, Ohio 45324

[21] Appl. No.: 533,711

[22] Filed: Sep. 26, 1995

[51] Int. Cl.$^6$ ........................ G08G 1/09
[52] U.S. Cl. ............... 340/905; 340/904; 340/901; 340/942; 340/439; 250/239; 250/397
[58] Field of Search ................. 340/905, 904, 340/901, 942, 438, 439; 250/239, 397

[56] References Cited

U.S. PATENT DOCUMENTS 4,143,264  3/1979  Gilbert et al. ................. 340/905

Primary Examiner—Jeffery Hofsass
Assistant Examiner—Daryl C. Pope

[57] ABSTRACT

A vehicle lane guide and alerting device securable to a vehicle for monitoring a position of the vehicle on a lane of a roadway delimited by light-reflective lane markers wherein the markers have a different reflectivity than the roadway itself, the vehicle lane guide and alerting device including a photo sensor mechanism coupled to a front end of the vehicle for capturing light that is reflected from the roadway; a differentiator mechanism coupled to the photo sensor mechanism for discriminating a sharp change in the reflected light above a given level when the vehicle crosses the lane markers on the roadway; a buffer mechanism coupled to the differentiator mechanism for registering the change in the reflected light; and an alarm mechanism coupled to the buffer mechanism for providing an alarm indication once the change in the reflected light is registered to thereby indicate that the vehicle is moving out of the lane.

1 Claim, 3 Drawing Sheets

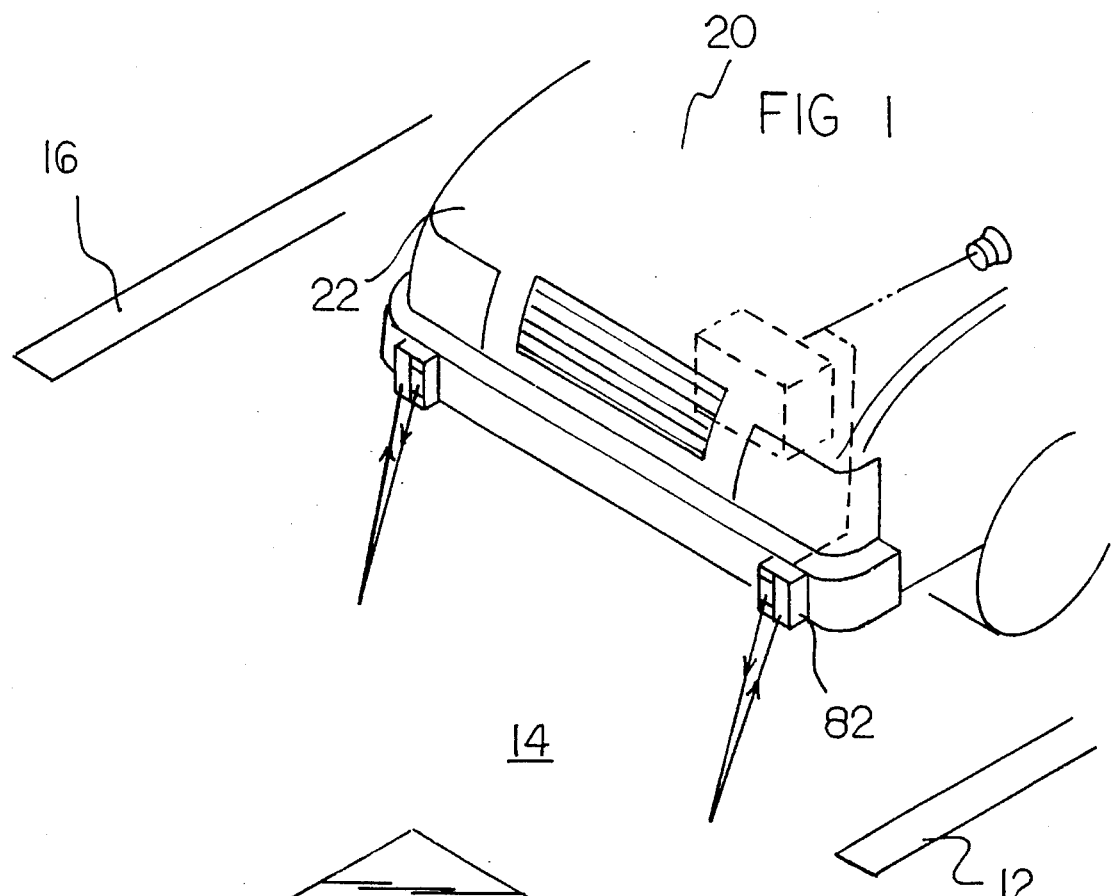
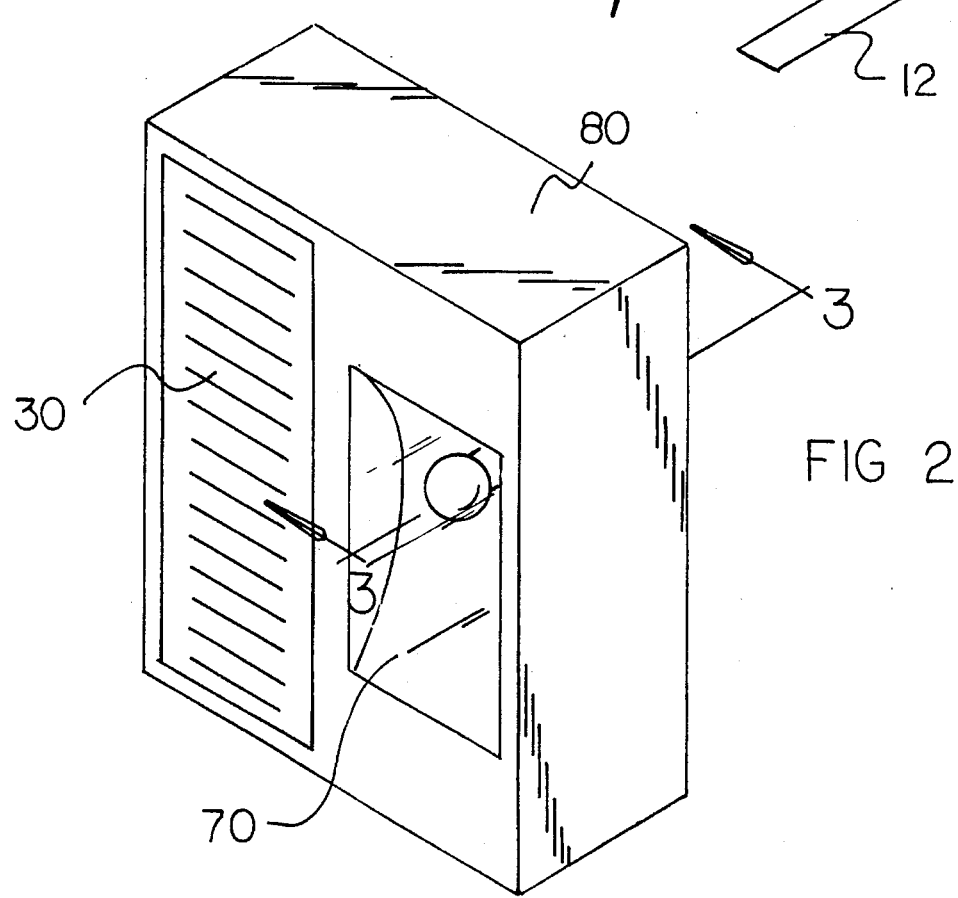

VEHICLE LANE GUIDE AND ALERTING DEVICE

BACKGROUND OF THE INVENTION

1. Field of the Invention

The present invention relates to a vehicle lane guide and alerting device and more particularly pertains to monitoring a position of a vehicle on a delimited lane of a roadway and providing an alarm when the vehicle moves out of that lane with a vehicle lane guide and alerting device.

2. Description of the Prior Art

The use of vehicle lane guiding or alarm systems is known in the prior art. More specifically, vehicle lane guiding or alarm systems heretofore devised and utilized for the purpose of providing an indication of when a vehicle deviates from a designated path of travel are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,081,585 to Kurami et al. discloses a control system for autonomous automotive vehicle or the like. U.S. Pat. No. 5,087,969 to Kamada et al. discloses an unmanned vehicle control system with guide line detection. U.S. Pat. No. 5,097,917 to Serizawa et al. discloses a steering system of a vehicle. U.S. Pat. No. 5,245,422 to Borcherts et al. discloses a system and method for automatically steering a vehicle within a lane in a road. U.S. Pat. No. 5,318,143 to Parker et al. discloses a method and apparatus for lane sensing for automatic vehicle steering.

While these devices fulfill their respective, particular objective and requirements, the aforementioned patents do not describe a vehicle lane guide and alerting device that monitors a position of a vehicle on a delimited lane of a roadway and provides an alarm when the vehicle moves out of that lane.

In this respect, the vehicle lane guide and alerting device according to the present invention substantially departs from the conventional concepts and designs of the prior art, and in doing so provides an apparatus primarily developed for the purpose of monitoring a position of a vehicle on a delimited lane of a roadway and providing an alarm when the vehicle moves out of that lane.

Therefore, it can be appreciated that there exists a continuing need for new and improved vehicle lane guide and alerting device which can be used for monitoring a position of a vehicle on a delimited lane of a roadway and providing an alarm when the vehicle moves out of that lane. In this regard, the present invention substantially fulfills this need.

SUMMARY OF THE INVENTION

In the view of the foregoing disadvantages inherent in the known types of vehicle lane guiding or alarm systems now present in the prior art, the present invention provides an improved vehicle lane guide and alerting device. As such, the general purpose of the present invention, which will be described subsequently in greater detail, is to provide a new and improved vehicle lane guide and alerting device and method which has all the advantages of the prior art and none of the disadvantages.

To attain this, the present invention essentially comprises, in combination, a vehicle roadway having at least one lane delimited by light-reflective lane markers. The markers have a higher reflectivity than the roadway itself. A vehicle is positionable upon the roadway and has a path of travel on the lane. A photo sensor mechanism is included and coupled to a front end of the vehicle for capturing light that is reflected from the roadway. A manually adjustable differentiator mechanism is included and coupled to the photo sensor mechanism for discriminating and amplifying a sharp change in the reflected light above a user-selected level when the vehicle crosses the lane markers on the roadway. A buffer mechanism is included and coupled to the differentiator mechanism for registering the change in the reflected light. A speaker mechanism is included and coupled to the buffer mechanism for providing an audible alert indication once the change in the reflected light is registered to thereby indicate that the vehicle is moving out of the lane. An illumination mechanism is included and coupled to the front end of the vehicle. The illumination mechanism is actuatable by a user under conditions of decreased visibility for transmitting light toward the roadway and thus creating reflected light for capture by the photo sensor mechanism. Lastly, a switch-controlled power source mechanism is included and coupled to the photo sensor mechanism, the differentiator mechanism, the buffer mechanism, the speaker mechanism, and the illumination mechanism for providing electrical energy for operation.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle lane guide and alerting device which has all the advantages of the prior art vehicle lane guiding or alarm systems and none of the disadvantages.

It is another object of the present invention to provide a new and improved vehicle lane guide and alerting device which may be easily and efficiently manufactured and marketed.

It is a further object of the present invention to provide a new and improved vehicle lane guide and alerting device which is of durable and reliable construction.

An even further object of the present invention is to provide a new and improved vehicle lane guide and alerting device which is susceptible of a low cost of manufacture with regard to both materials and labor, and which accordingly is then susceptible of low prices of sale to the consuming public, thereby making such a vehicle lane guide and alerting device economically available to the buying public.

Still yet another object of the present invention is to provide a new and improved vehicle lane guide and alerting device which provides in the apparatuses and methods of the prior art some of the advantages thereof, while simultaneously overcoming some of the disadvantages normally associated therewith.

Even still another object of the present invention is to provide a new and improved vehicle lane guide and alerting device for monitoring a position of a vehicle on a delimited lane of a roadway and providing an alarm when the vehicle moves out of that lane.

Lastly, it is an object of the present invention to provide a new and improved vehicle lane guide and alerting device comprising a photo sensor mechanism coupled to a front end of the vehicle for capturing light that is reflected from the roadway; a differentiator mechanism coupled to the photo sensor mechanism for discriminating a sharp change in the reflected light above a given level when the vehicle crosses the lane markers on the roadway; a buffer mechanism coupled to the differentiator mechanism for registering the change in the reflected light; and an alarm mechanism coupled to the buffer mechanism for providing an alarm indication once the change in the reflected light is registered to thereby indicate that the vehicle is moving out of the lane.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment constructed in accordance with the principles of the present invention.

FIG. 2 is an enlarged perspective view of the illuminator and light sensor mechanism contained within a common housing.

The same reference numerals refer to the same parts through the various Figures.

DESCRIPTION OF THE PREFERRED EMBODIMENT

Figure 3:
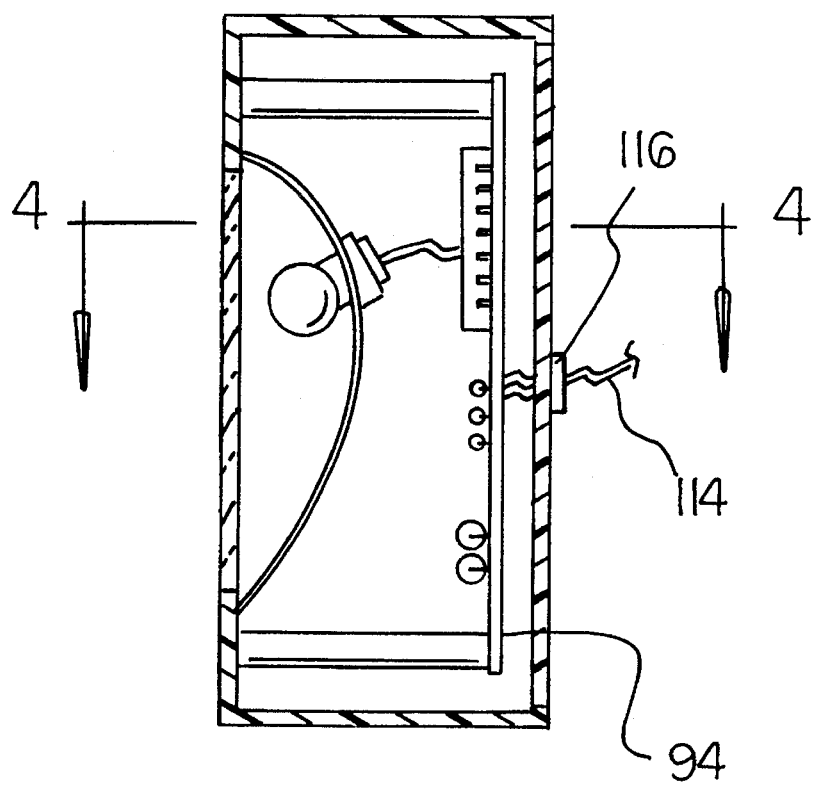
FIG. 3 is a cross-sectional view of the present invention taken along the line 3—3 of FIG. 2.
Figure 4:
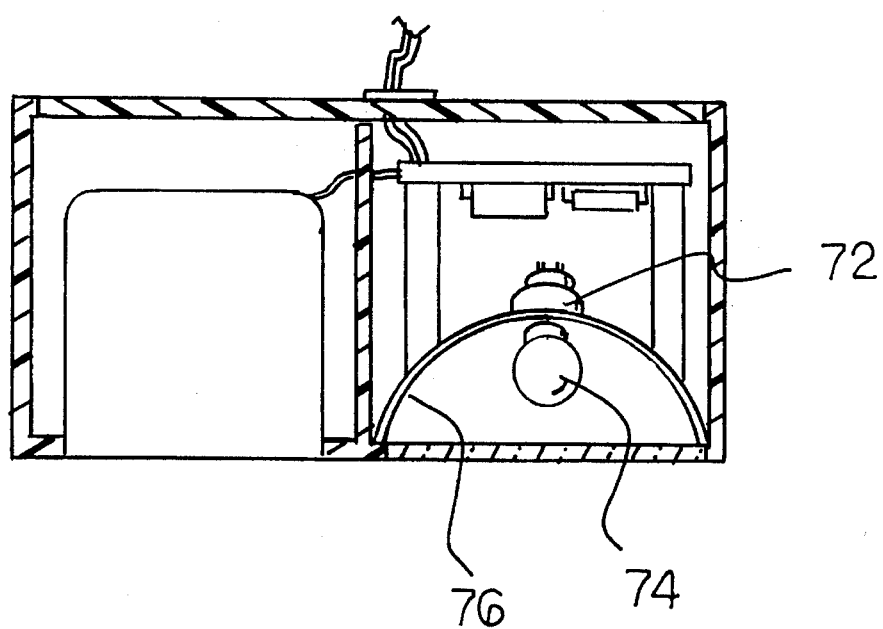
FIG. 4 is a cross-sectional view of the present invention taken along the line 4—4 of FIG. 3.
Figure 5:
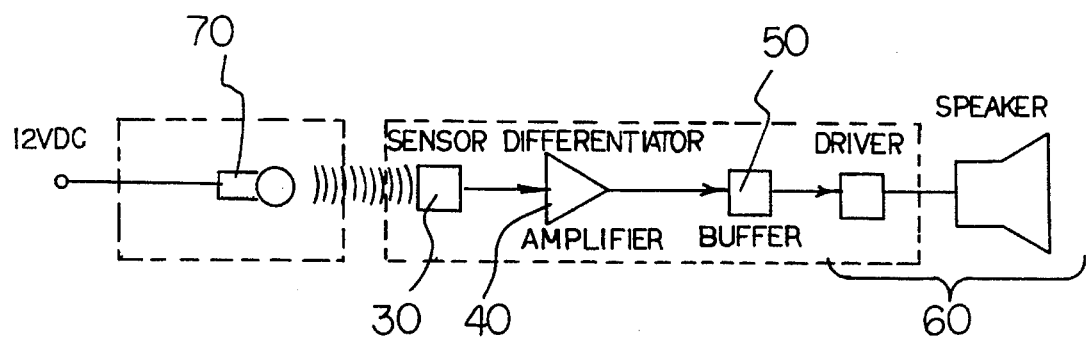
FIG. 5 is a top level block diagram of the present invention.
Figure 6:
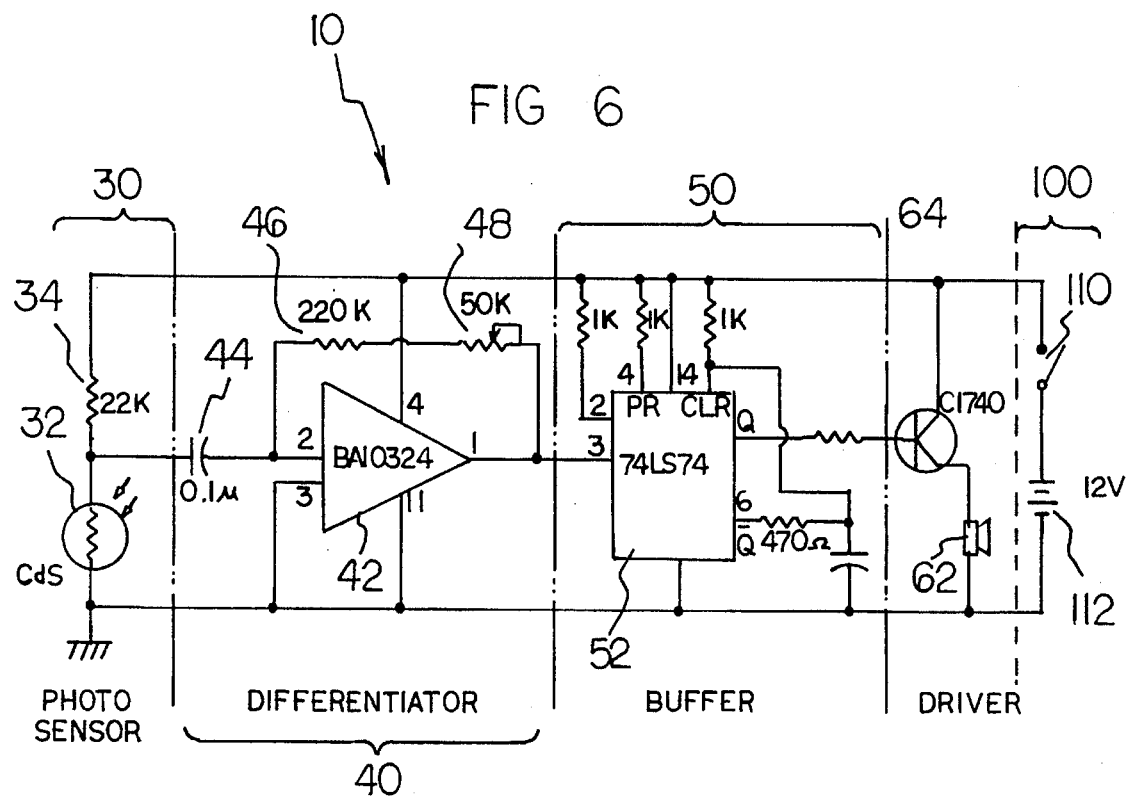
FIG. 6 is a schematic diagram of the present invention.

With reference now to the drawings, and in particular, to FIG. 1 thereof, the preferred embodiment of the new and improved vehicle lane guide and alerting device embodying the principles and concepts of the present invention and generally designated by the reference number 10 will be described.

The preferred embodiment of the present invention comprises a plurality of components. In their broadest context, such components include a photo sensor mechanism, differentiator mechanism, buffer mechanism, speaker mechanism, illumination mechanism, and power source mechanism. Such components are individually configured and correlated with respect to each other to allow monitoring of a position of a vehicle on a delimited lane of a roadway and providing an alarm when the vehicle moves out of that lane.

The present invention is adapted for use on a vehicle roadway 12. The roadway has at least one lane 14 that is delimited by light-reflective lane markers 16 of a continuous or hashed type. The lane markers have a higher reflectivity than the roadway itself, or vice versa. The present invention is also used in conjunction with and coupled to a conventional motor vehicle 20. The vehicle is positioned upon the roadway 12. The vehicle has a front end 22 and a path of travel on the lane between the lane markers 16.

Specifically, the present invention includes a conventional photo sensor mechanism 30. The photo sensor mechanism is formed of a cadmium sulfide photo detector 32 and level resistor 34. The photo sensor mechanism is coupled to the front end of the vehicle 20 and captures light that is reflected from the roadway 12 and lane markers 16 and provides a signal indicative of the intensity of the light captured.

Coupled to the photo sensor mechanism is a differentiator mechanism 40. The differentiator mechanism is formed of a conventional BA10324 operational amplifier 42, a DC blocking capacitor 44, level resistor 46, and manually adjustable potentiometer 48. The differentiator mechanism 40 is used for receiving the signal and then discriminating and amplifying a sharp change in the reflected light above a user selected level when the vehicle 20 crosses the lane markers 16 on the roadway 12. The potentiometer 48 is used to increase or decrease the sensitivity of the differentiator mechanism to register changes in intensity of a signal provided by the photo sensor mechanism 30. The potentiometer is preferably secured on or near the dashboard of the vehicle.

A buffer mechanism 50 or keep and delay unit is coupled to the differentiator mechanism 40. The buffer mechanism is used for registering the change in the reflected light as measured through the signal output from the differentiator mechanism 40. The differentiator mechanism is formed of a D-flip flop. The D-flip flop used is a conventional 74LS74 integrated circuit with an associated resistive and capacitive support network. The D-flip flop delivers a high level voltage from the D terminal to the Q terminal. The D-flip flop is thus used as a buffer which takes the output of the differentiator mechanism and uses it as a trigger pulse to force its output to a high level when the vehicle crosses the lane markers 16.

To provide an alarm indication to a user of the present invention, a speaker mechanism 60 is coupled to the buffer mechanism. The speaker mechanism is formed of a conventional speaker 62 and a conventional PNP C1740 transistor 64. The speaker mechanism provides an alarm audible indication once the change in reflected light is registered to indicate that the vehicle is moving out of the lane.

In addition, an illuminator mechanism 70 can be provided. The illuminator mechanism is coupled to the front end 22 of the vehicle. The illuminator mechanism is formed of an electric socket 72 and wires, a replaceable incandescent bulb 74 secured in the socket, and a parabolic reflector 76. The illuminator mechanism is actuatable by a user through an unillustrated switch on the dashboard of the vehicle under conditions of decreased visibility or upon the user's discretion for transmitting light toward the roadway 12, thus creating reflected light for capture by the photo sensor mechanism 30. In the preferred embodiment, the illuminator mechanism 70 and the sensor mechanism 30 are contained in a common rigid and box-shaped plastic housing 80 to thus define a transceiver 82. Preferably, two transceivers are utilized on a vehicle 20. One transceiver is mounted near the right front corner of the vehicle for monitoring the lane markers on the right side of the roadway and the other on the left front corner of the vehicle to monitor the lane markers on the left side of the roadway. In addition, to allow for a visual safe guard-type effect, each transceiver opening can be covered with a purple or green transparent illuminator cover. The electronic components of the present invention and integrated circuits thereof are mounted on a printed circuit board 94 within each housing 80 of each transceiver.

Lastly, a power source mechanism 100 formed of a conventional switch 110 and a 12-volt power source 112 is included. The switch is of a single pull single throw type, and the power source is either the battery of the vehicle or a supplementary self-contained battery that mounts under the dashboard of the vehicle. The power source mechanism is coupled to the photo sensor mechanism 30 through use of a power cable 114 that is extended through the housing of each transceiver and backfit with a grommet 116 to form an environmental seal. The power source mechanism is also coupled to the differentiator mechanism 40, the buffer mechanism 50, the speaker mechanism 60, and the illumination mechanism 70. The power source mechanism provides electrical energy for operation of the present invention.

The present invention is a system that automatically alerts a driver if the vehicle crosses a lane divider line or drifts to the shoulder of the roadway. The present invention consists of one or two light sensors and associated circuitry. The sensors detect a change in light conditions such as the transition from the normal surface of the road to white or yellow dividing line markers. One sensor is mounted on each side of a vehicle's front end. Both the sensor mechanism and illuminator are contained in a sensor housing. The sensor and illuminator are directional so that they will not be triggered by lines crossing the road in a direction perpendicular to vehicle travel. The electronic circuitry of the present invention features a sensitivity adjustment for different light conditions.

Preferably two photo sensors and two illuminator mechanisms are used. The photo senors detect light reflected from the roadway, for example, sunlight during the day and light from the illuminator or vehicle headlights at night. So long as conditions are constant, no alarm will sound. However, should the reflective light intensity change, the alarm will sound, and the driver will be immediately alerted. The present invention can include circuitry to deactivate itself when the turn signals of the vehicle are in use or when the vehicle's speed is less than 30 mph.

The present invention is easily installed and adjusted. It can be added to existing vehicles on a retrofit basis or included in new vehicles as original equipment. The present invention is especially valuable when used by truck drivers who are obligated to drive for extended periods of time and tend to lose concentration.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A vehicle lane guide and alerting device for monitoring a position of a vehicle on a delimited lane of a roadway and providing an alarm when the vehicle moves out of that lane comprising, in combination:

a vehicle roadway having at least one lane delimited by light-reflective lane markers and with the markers having a higher reflectivity than the roadway itself;

a vehicle positionable upon the roadway and having a path of travel on the lane;

a pair of transceivers each coupled to the front end of the vehicle and each comprising:

a rigid box-shaped plastic housing, photo sensor means including a cadmium sulfide photo detector and level resistor coupled to a front end of the vehicle for capturing light that is reflected from the roadway, wherein the photo sensor means is directional so as to not be triggered by lines crossing the road perpendicular to vehicle travel, manually adjustable differentiator means coupled to the photo sensor means for discriminating and amplifying a sharp change in the reflected light above a user-selected level when the vehicle crosses the lane markers on the roadway, the differentiator means comprising an operational amplifier, a direct current blocking capacitor, a level resistor, and a manually adjustable potentiometer situated on a dash of the vehicle, buffer means coupled to the differentiator means for registering the change in the reflected light, the buffer means comprising a D-flip flop with an associated resistive and capacitative support network, whereby the D-flip flop delivers a high level voltage from a D-terminal thereof to a Q-terminal thereof thus utilizing the D-flip flop as a buffer which takes the output of the differentiator mechanism and uses it as a trigger pulse to force the output to a high level when the vehicle crosses the lane markers, speaker means coupled to the buffer means for providing an audible alert indication once the change in the reflected light is registered to thereby indicate that the vehicle is moving out of the lane, the speaker means comprising of a conventional speaker and a transistor, illumination means coupled to the front end of the vehicle and actuatable by a user under conditions of decreased visibility for transmitting light toward the roadway and thus creating reflected light for capture by the photo sensor means, the illumination means comprising of an electric socket, wires, an incandescent bulb secured in the socket, and a parabolic reflector, a colored transparent illuminator cover for providing visual safe guard effect, and switch-controlled power source means coupled to the photo sensor means, the differentiator means, the buffer means, the speaker means, and the illumination means for providing electrical energy for operation.

* * * * *